United States Patent [19]

Das et al.

[11] Patent Number: 4,988,766
[45] Date of Patent: Jan. 29, 1991

[54] POLYMERS PREPARED BY POLYMERIZING ALPHA, BETA-ETHYLENICALLY UNSATURATED ACIDS AND EPOXY COMPOUNDS AND CROSSLINKED PRODUCTS THEREFROM

[75] Inventors: Suryya K. Das, Pittsburgh; Samuel Porter, Jr., Natrona Heights; Wayne H. Tyger, New Kensington, all of Pa.

[73] Assignee: PPG Industries, Inc., Pittsburgh, Pa.

[21] Appl. No.: 246,603

[22] Filed: Sep. 20, 1988

Related U.S. Application Data

[62] Division of Ser. No. 49,236, May 13, 1987, Pat. No. 4,818,796.

[51] Int. Cl.$^5$ .................. C08F 18/02; C08F 20/26
[52] U.S. Cl. .................... 525/123; 525/162; 525/329.5; 525/330.1; 525/385; 525/451; 526/320; 528/393
[58] Field of Search ............... 525/123, 162, 329.5, 525/330.1, 385, 451

[56] References Cited

U.S. PATENT DOCUMENTS

| | | | |
|---|---|---|---|
| 3,256,225 | 6/1966 | Nevin | 528/361 |
| 3,330,814 | 7/1967 | Vasta | 525/162 |
| 3,366,706 | 1/1968 | Vasta | 525/514 |
| 3,442,873 | 5/1969 | Vasta | 525/162 |
| 3,494,605 | 2/1970 | Rehfuss | 525/162 |
| 3,549,583 | 12/1970 | Nagata et al. | 524/871 |
| 3,642,739 | 2/1972 | Gogh et al. | 525/162 |
| 3,719,619 | 3/1973 | Nagata et al. | 528/361 |
| 3,741,798 | 6/1973 | Dalibor | 427/375 |
| 3,745,137 | 7/1973 | Reid et al. | 525/162 |
| 3,786,020 | 1/1974 | Emmons | |
| 3,919,146 | 11/1975 | Emmons | |
| 4,145,513 | 3/1979 | Dalibor | 528/75 |
| 4,163,739 | 8/1979 | Dalibor | 524/284 |
| 4,163,836 | 8/1979 | Dalibor | 528/366 |
| 4,177,183 | 12/1979 | Dalibor | 524/317 |
| 4,314,918 | 2/1982 | Birkmeyer et al. | 525/162 |
| 4,357,455 | 11/1982 | Mondt et al. | 525/330.1 |
| 4,555,535 | 11/1985 | Bednarek et al. | 525/123 |

FOREIGN PATENT DOCUMENTS

| | | |
|---|---|---|
| 0000601 | 2/1979 | European Pat. Off. . |
| 0000608 | 2/1979 | European Pat. Off. . |
| 2243422 | 3/1973 | Fed. Rep. of Germany ... 525/330.1 |
| 1009217 | 11/1965 | United Kingdom ............. 525/330.1 |
| 1060711 | 3/1967 | United Kingdom ............. 525/330.1 |
| 1549059 | 7/1979 | United Kingdom . |

*Primary Examiner*—John Kight, III
*Assistant Examiner*—Frederick Krass
*Attorney, Agent, or Firm*—William J. Uhl

[57] ABSTRACT

Hydroxyl-containing polymers prepared by reaction of a polymerizable alpha, beta-ethylenically unsaturated carboxylic acid and an epoxy compound containing greater than 5 carbon atoms are disclosed. The polymer is prepared by free radical organic solution polymerization techniques. Synthesis of the polymers by this technique assures multiple hydroxyl functionality in all polymer chains thereby providing good cure response. The polymers are useful as binders in high solids coating compositions. When used with appropriate curing agents, the resultant coatings have good hardness, high gloss and distinctness of image, have good solvent and humidity resistance and are very resistant to acid etching.

9 Claims, No Drawings

POLYMERS PREPARED BY POLYMERIZING ALPHA, BETA-ETHYLENICALLY UNSATURATED ACIDS AND EPOXY COMPOUNDS AND CROSSLINKED PRODUCTS THEREFROM

This is a division of application Ser. No. 49,236, filed May 13, 1987, now U.S. Pat. No. 4,818,796.

BACKGROUND OF THE INVENTION

1. Field of the Invention

The present invention is in the field of hydroxyl-containing polymers prepared from alpha, beta-ethylenically unsaturated monomers, and more particularly, to low molecular weight polymers prepared from reacting alpha, beta-ethylenically unsaturated acids and epoxy compounds.

2. Brief Description of the Prior Art

High solids or low organic solvent-containing compositions are becoming increasingly important in the coatings industry because state and local governments are requiring low solvent emissions from the coatings. To achieve the necessary high solids content, the resinous binder is usually a low molecular weight polymer. Such polymers have relatively fluid viscosities enabling them to be formulated with low amounts or even no organic solvent and yet still have the flowability necessary for good coating application properties. Unfortunately, coatings prepared from low molecular weight polymers often have poor physical and chemical properties. This is particularly the situation with regard to thermosetting acrylic coating compositions prepared from low molecular weight hydroxyl-functional copolymers and curing agents such as aminoplast resins. Although not intending to be bound by any theory, it is believed that because of the relatively high reactivity of the hydroxyl-containing acrylic monomers in comparison with the non-functional acrylic monomers, many of the polymer chains do not contain hydroxyl functionality. As a result, these non-functional polymer species are weak links in the cured coating since they do not contain sites for crosslinking.

Although it would be possible in principle to prepare polymers from only hydroxyl-containing monomers such as hydroxypropyl acrylate and hydroxyethyl methacrylate, thus assuring that every polymer would contain hydroxyl functionality, in practice it is not possible to do so. Such polymers are not useful in industrial coatings application because of their limited solubility and their hydrophilicity. They are simply too sensitive to humidity to be useful for many industrial coating applications.

SUMMARY OF THE INVENTION

In accordance with the present invention, a hydroxyl-containing polymer is provided. The polymer is prepared by heating in the presence of a free radical initiator and optionally a chain transfer agent the following reactive ingredients in an organic solvent in which the polymer and the ingredients are soluble:

(A) a polymerizable alpha, beta-ethylenically unsaturated carboxylic acid group-containing monomer and (B) an epoxy compound containing at least 5 carbon atoms which is not addition polymerizable with (A). (A) and (B) above amount to at least 80 percent by weight of the reactive ingredients and the equivalent ratio of acid in (A) to epoxy in (B) is at least 1 to 1.

The present invention insures that substantially all of the polymer chains will have multiple hydroxyl functionality thereby providing optimum cure response; yet the polymers have good solubility and are not hydrophilic as evidenced by the good humidity resistance of cured coatings based on the polymers.

The alpha, beta-ethylenically unsaturated carboxylic acid and the epoxy compound can be pre-esterified prior to polymerization and the resultant reaction product polymerized by free radical initiated polymerization techniques. Alternately, the alpha, beta-ethylenically unsaturated carboxylic acid and epoxy compound can be simultaneously esterified and polymerized.

The resultant polymers when formulated with appropriate curing agents such as aminoplasts have been found to provide cured coatings with excellent properties such as hardness, solvent resistance, humidity resistance and resistance to acid etching which is becoming an increasing problem because of the acidic atmosphere in many portions of the country. Also, somewhat surprisingly, it has been found that high solids thermosetting coating compositions containing the hydroxyl-containing polymers of the present invention and aminoplast and polyisocyanate curing agents when applied as coatings and cured have outstanding gloss and distinctness of image (DOI), i.e., the ability of the cured coating to reflect images in a sharp, well-defined manner. The compositions are useful as automotive top coats both as original finishes and as repair coats.

DETAILED DESCRIPTION

The reactive ingredients used in preparing the hydroxyl-containing polymer of the present invention are a polymerizable alpha, beta-ethylenically unsaturated carboxylic acid and an epoxy compound containing at least 5 carbon atoms which is not addition polymerizable with the alpha, beta-ethylenically unsaturated carboxylic acid.

Examples of polymerizable alpha, beta-ethylenically unsaturated acids are monocarboxylic acids such as acrylic acid, methacrylic acid, crotonic acid; dicarboxylic acids such as itaconic acid, maleic acid and fumaric acid; monoesters of dicarboxylic acids such as monobutyl maleate and monobutyl itaconate. Preferred are monocarboxylic acids, especially acrylic acid and methacrylic acid.

The epoxy compounds are those which contain greater than 5 carbon atoms and which are not addition polymerizable with the alpha, beta-ethylenically unsaturated acid. In other words, the epoxy compound does not contain alpha, beta-ethylenic unsaturation which would participate in free radical initiated polymerization with the alpha, beta-ethylenically unsaturated acid. Examples of such epoxy compounds are glycidyl esters and ethers, preferably those containing from 8 to 30 carbon atoms. Examples of glycidyl ethers are glycidyl ethers of alcohols and phenols such as butyl glycidyl ether, octyl glycidyl ether, phenyl glycidyl ether and para-(tertiary-butyl) phenyl glycidyl ether.

Examples of glycidyl esters are those of the structure:

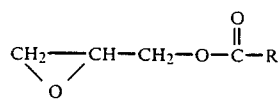

where R is a hydrocarbon radical containing from 4 to 26 carbon atoms. Examples of such materials are glycidyl butyrate, glycidyl palmitate, glycidyl laurate and glycidyl stearate. Preferably, R is a branched hydrocarbon radical, more preferably a tertiary aliphatic group of 8 to 10 carbon atoms such as neopentanoate, neoheptanoate and neodecanoate. Glycidyl esters of commercially available mixtures of tertiary aliphatic carboxylic acids such as those available from the Shell Chemical Company as VERSATIC ACID 911 are particularly preferred. The glycidyl esters themselves are also commercially available from Shell Chemical Company as CARDURA E.

Examples of other epoxy compounds are 1,2-pentene oxide, styrene oxide and glycidol.

The polymerizable alpha, beta-ethylenically unsaturated carboxylic acid and epoxy compound are present in an equivalent ratio (acid to epoxy) of at least 1 to 1, preferably 10 to 1:1. Ratios less than 1:1 are undesirable because of unreacted epoxy compound in the reaction mixture. Ratios greater than 1:1 result in carboxylic acid functionality in the reaction product. Such reaction products can be combined with epoxy curing agents and can be neutralized with base to form water-based compositions. Ratios greater than 10:1 can be used but are not believed to provide any significant advantages.

The polymerizable alpha, beta-ethylenically unsaturated carboxylic acid and epoxy compound constitute at least 80 percent, preferably at least 85 percent, by weight of the reactive ingredients with the remaining portion being selected from other polymerizable alpha, betaethylenically unsaturated monomers such as esters of alpha, beta-ethylenically unsaturated acids, for example, esters of acrylic and methacrylic acid containing from 1 to 12 carbon atoms and hydroxyalkyl esters of acrylic and methacrylic acid containing from 2 to 3 carbon atoms in the alkyl group. Specific examples of such esters would be methyl methacrylate, butyl acrylate, hydroxyethyl methacrylate and hydroxypropyl acrylate. Other polymerizable alpha, beta-ethylenically unsaturated monomers such as styrene and vinyl toluene, vinyl chloride, vinyl acetate and acrylonitrile may also be used as can mixtures of monomers. Preferably, the other monomers are used in amounts less than 15 percent by weight of the reactive ingredients.

The polymers of the present invention are prepared by organic solution polymerization techniques. In one embodiment, the alpha, beta-ethylenically unsaturated acid and epoxy compound are pre-esterified prior to free radical initiated polymerization. Alternately, the alpha, beta-ethylenically unsaturated acid and epoxy compound can be simultaneously esterified and polymerized. This latter method of reaction is preferred because it only involves one step instead of two. Also, when the reactive ingredients are pre-esterified, they are usually done so in the presence of catalyst such as amine and free radical inhibitor which are detrimental to coating performance, especially color.

In conducting the polymerization and esterification simultaneously, the temperature should be high enough to insure that the polymerization and esterification are occurring at about the same rate. In conducting the reaction, the reactive ingredients are heated in the presence of a free radical initiator and optionally a chain transfer agent in an organic solvent in which the ingredients as well as the resultant polymer are soluble. Typically, the epoxy compound along with a portion of the organic acid and optionally the chain transfer agent is charged to a reaction vessel and heated under an inert atmosphere to reflux. The alpha, beta-ethylenically unsaturated acid and optionally the other alpha, beta-ethylenically unsaturated monomers and the free radical initiator are added slowly to the refluxing reaction mixture. After the addition is complete, some additional free radical initiator may be added and the reaction mixture held at elevated temperature to complete the reaction. The temperature of reaction is preferably at least 130° C, more preferably from 150° to 180° C to insure that the free radical initiated polymerization is occurring at the same rate as the esterification reaction between the epoxy and acid groups without any added catalyst such as tertiary amine or tin catalyst. Lower temperatures may be used if the glycidyl compound and the alpha, betaethylenically unsaturated acid are pre-esterified prior to the free radical initiated polymerization.

Among the organic solvents which may be used for the polymerization are those which have a boiling point of at least 150° C and usually from 150° to 210° C. These would include, for example, ketones such as methyl amyl ketone; esters such as hexyl acetate and heptyl acetate; glycol ethers and glycol esters such as propylene glycol monoethyl ether acetate and isobutyl isobutyrate.

Usually, the amount of organic solvent which is used is from about 50 to 80 percent by weight based on total weight of organic solvent and reactive ingredients.

Examples of free radical initiators are those which are soluble in the polymerization medium such as azobis(isobutyronitrile), azobis(alpha, gamma-dimethylvaleronitrile), tertiary-butylperbenzoate, tertiary-butylperacetate, ditertiarybutyl peroxide and benzoyl peroxide. The free radical initiator is usually present in amounts of about 0.1 to 10 percent by weight based on total weight of polymerizable alpha, beta-ethylenically unsaturated monomer.

Examples of the chain transfer agents are alkyl mercaptans such as tertiary-dodecyl mercaptan. When used, these materials are present in amounts of up to 5 percent by weight based on weight of polymerizable alpha, beta-ethylenically unsaturated monomers.

The polymers of the present invention have hydroxyl numbers of at least 100, preferably 135 to 168 (100 percent solids) and preferably weight average molecular weights ($M_w$) of less than 15,000, more preferably about 1000 to 6000. $M_w$ greater than 15,000 are less preferred because the resultant polymers will have high viscosities and require high amounts of organic solvent to formulate coating compositions with the proper application properties. The molecular weights of the polymers are determined by gel permeation chromatography using a polystyrene standard. Therefore, what is obtained is a polystyrene number. However, for the purposes of the invention, they are considered to be molecular weights.

In measuring the weight average molecular weight using polystyrene as the standard, a Waters Associates Gel Permeation Chromatograph Model 201 was used. Four $\mu$-Styragel columns were used. Each column has the dimensions of 30 centimeters long and 7.8 millimeters inside diameter. A differential refractometer was used as the detector, and the columns were arranged according to their pore size on the order of $10^4$-$10^3$-500-100 Angstroms with the $10^4$ Angstrom column being the first one. Tetrahydrofuran was used as a solvent with a flow rate of 2.0 milliliters/minute. The quality of the columns is checked by their "theoretical plate number" determined from ortho-dichlorobenzene and those columns with theoretical plate numbers greater than 3000/30 cm. were used.

To determine molecular weight by gel permeation chromatography (GPC), the instrument is first calibrated using a polystyrene standard. The polystyrene standards used were purchased from Pressure Chemicals Company, Pittsburgh, Pa., and Waters Associates. Polystyrene standards have dispersities (dispersity = weight average molecular weight/number average molecular weight) ranging from 1.05 to 1.10. The weight average molecular weights of the polystyrene standards used were 110,000; 34,500; 20,000; 9,000; 4,000; 2,900; 1,000. To obtain a calibration curve, a set of 1.0 percent (10 milligram polystyrene/1.0 ml. tetrahydrofuran) polystyrene solutions in tetrahydrofuran were prepared and a 0.2 ml. sample size was injected into the columns and a GPC chromatogram was obtained. The elution volume of each peak corresponding to a given molecular weight of the polystyrene standard was measured and the data was plotted on a semi-logarithmic paper (logarithm scale in the ordinate and a linear scale in the abscissa). A linear least squares plot of $\log_{10}$ (molecular weight) versus elution volume in milliliters is used as a calibration curve. The sample whose molecular weight averages are to be determined was prepared as a 1.0 percent tetrahydrofuran solution. After filtration to remove gel particles (if present), through a 0.5 micron MILLIPORE filter available from Millipore Corporation, Catalog No. FHLP01300, a 0.2 ml. sample size was injected into the columns and a GPC chromatogram obtained under the same experimental conditions as the calibration. The chromatogram is divided into vertical segments of equal elution volume approximately 1 milliliter and the height ($H_i$) of each segment and the corresponding molecular weight ($M_i$) obtained from the calibration curve are used to calculate the weight average molecular weight ($M_w$) according to the following equation:

$$M_w = (\epsilon H_i M_i)/(\epsilon H_i)$$

To form curable or thermosetting compositions, the polymers of the present invention are combined with a curing agent which is reactive with the active hydrogens in the polymer. The preferred curing agents are aminoplast resins which are aldehyde condensation products of amines or amides with aldehydes. Examples of suitable amines or amides are melamine, benzoguanamine, urea and similar compounds. Generally, the aldehyde employed is formaldehyde, although products can be made from other aldehydes such as acetaldehyde and furfuryl. Condensation products contain methylol groups or similar alkylol groups depending upon the particular aldehyde employed. If desired, these methylol groups can be etherified by reaction with an alcohol. Various alcohols are employed and generally include any monohydric alcohol, although the preferred alcohol contains from 1 to 4 carbon atoms such as methanol, ethanol, isopropanol and n-butanol. Aminoplasts are commercially available from the American Cyanamid Company under the trademark CYMEL and from the Monsanto Chemical Company under the trademark RESIMINE.

The thermosetting compositions will generally contain from about 20 to 80, preferably 25 to 50 percent by weight of the hydroxyl-containing acrylic polymer, and from 15 to 50, preferably from 30 to 50 percent by weight aminoplast; the percentages by weight being based on total weight of resin solids.

Besides aminoplasts, other curing agents such as polyisocyanates which are reactive with hydroxyl groups can be used.

Among the polyisocyanates which may be used are aliphatic or alicyclic polyisocyanates such as hexamethylene diisocyanate, dicyclohexylmethane diisocyanate, aromatic polyisocyanates such as 2,4- and 2,6-toluene diisocyanate, diphenylmethane-4,4'-diisocyanate; arylalkyl polyisocyanates such as o-, m- and p-xylylene diisocyanate; isophorone diisocyanate; polyurethane polyisocyanates obtained from reacting polyisocyanates such as those mentioned above with polyhydroxy compounds such as ethylene glycol and trimethylolpropane. Polyisocyanates containing isocyanurate, allophanate or biuret groups can also be used. The polyisocyanate is used in amounts so that there are 0.3 to 5.0 equivalents of isocyanate for each equivalent of hydroxyl.

The thermosetting compositions are particularly useful as coating compositions. For coatings use, the thermosetting composition can be formulated as a clear coat or optionally it can contain a pigment. The pigments may be any of the conventional types comprising, for example, iron oxides, lead oxide, strontium chromate, carbon black, coal dust, titanium dioxide, talc, barium sulfate, as well as the color pigments such as cadmium yellow, cadmium red, chromium yellow, phthalocyanine blue, toluidine red, and the metallic pigments such as aluminum flake and metal oxide encapsulated mica. When used, the pigment content of the coating composition is expressed as a pigment to resin weight ratio, and is usually within the range of about 0.05 to 0.25:1.

In addition, other optional ingredients such as adjuvant hydroxy-containing polymers, fillers, plasticizers, catalysts, reactive diluents, anti-oxidants, ultraviolet light absorbers, flow control agents, and other formulating additives can be employed if desired. These materials will generally constitute up to 50 percent by weight of the composition based on total weight of the resinous film-forming ingredients.

The hydroxyl-containing polymers of the present invention can be formulated into high resin solids coating compositions, that is, coating compositions having a resin solids content of at least 50 and usually from about 50 to 75 percent by weight with the solids being determined by heating at 110° C for 60 minutes.

The coating compositions of the invention can be applied to a variety of substrates such as wood, metal, glass, cloth, plastic, foams and the like by a variety of application techniques such as air spraying, airless spraying, dipping, brushing and flow coating. Usually, the coating composition will be applied by spraying. The coating compositions are particularly desirable as topcoat compositions for automobiles and trucks either as original finishes or as repair coats.

For repair coatings, lower temperatures are used, typically, 140° to 180° F. (60° to 82° C). For original finishes, higher temperatures, typically, 225° to 300° F (107° to 149° C) are used. The time for curing usually ranges from 10 to 60 minutes. Upon heating the coating to the curing temperature, the coating will coalesce on the substrate to form a dried coating in the crosslinked state. The dry film thickness of the resultant coating will usually be from about 0.5 to 2 mils.

The compositions of the invention can be further illustrated by reference to the following examples wherein parts are parts by weight unless otherwise indicated.

EXAMPLES

The following examples (1–3) show the preparation of hydroxyl-containing polymers in accordance with the present invention.

EXAMPLE 1

A hydroxyl-containing acrylic polymer from the glycidyl ester of versatic acid (CARDURA E), acrylic acid (1:1 equivalent ratio acid to epoxy), methyl methacrylate and butyl acrylate was prepared as follows:

| Ingredients | Parts by Weight (grams) |
| --- | --- |
| CARDURA E[1] | 937.5 (75.3%) |
| DOWANOL PM acetate[2] | 107.5 |
| Methyl methacrylate | 25.1 (2%) |
| Acrylic acid | 270.0 (21.7%) |
| DOWANOL PM acetate | 378.0 |
| Ditertiarybutyl peroxide | 3.75 |
| Butyl acrylate | 12.4 (1%) |

[1]Glycidyl ester of versatic acid available from the Shell Chemical Company.
[2]Propylene glycol monoethyl ether acetate available from Dow Chemical Company.

The CARDURA E and the first portion of DOWANOL PM acetate were charged to a suitable reactor and heated under a nitrogen atmosphere to reflux at about 160° C. The methyl methacrylate, acrylic acid, second portion of DOWANOL PM acetate, ditertiarybutyl peroxide and butyl acrylate were premixed and added to the reactor charge slowly over a period of about 3 hours while maintaining the reaction temperature at reflux. When addition was complete, the reaction mixture was held for 4 hours at 155° C until an acid value of 1.32 was obtained. The reaction mixture was cooled to room temperature and found to have a solids content of 70 percent. The polymer had a hydroxyl number of 168 (100 percent solids) and a weight average molecular weight ($M_w$) of about 5300.

EXAMPLE 2

A hydroxyl group-containing polymer from CARDURA E, acrylic acid (1:1 equivalent ratio acid to epoxy), methyl methacrylate, butyl acrylate and hydroxyethyl methacrylate was prepared as follows:

| Ingredients | Parts by Weight (grams) |
| --- | --- |
| CARDURA E | 1107.5 (65.3%) |
| DOWANOL PM acetate | 127.0 |
| Methyl methacrylate | 29.7 (2%) |
| Butyl acrylate | 14.7 (1%) |
| Acrylic acid | 319.0 (21.7%) |
| Hydroxyethyl methacrylate | 147.1 (10%) |
| Ditertiarybutyl peroxide | 4.45 |
| DOWANOL PM acetate | 502.2 |

The CARDURA E and the first portion of DOWANOL PM acetate were charged to a suitable reactor and heated under a nitrogen atmosphere to reflux at about 180° C. The remaining ingredients were premixed and added slowly to the reactor charge over a 3-hour period while maintaining the temperature at reflux. When the addition was complete, the reaction mixture was held at 148° C for 4 hours until an acid value of 4.1 was obtained. The reaction mixture was cooled to room temperature and found to have a solids content of 69.3 percent. The polymer had a hydroxyl number of 165 and a weight average molecular weight of about 5500.

EXAMPLE 3

A hydroxyl-containing polymer from CARDURA E, methyl methacrylate and acrylic acid (equivalent ratio of acid to epoxy of 1:1) was prepared as follows:

| Ingredients | Parts by Weight (grams) |
| --- | --- |
| CARDURA E | 3375.0 (75.3%) |
| DOWANOL PM acetate | 387.0 |
| Methyl methacrylate | 135.0 (3%) |
| Acrylic acid | 972.0 (21.7%) |
| DOWANOL PM acetate | 1361.0 |
| Ditertiarybutyl peroxide | 13.5 |

The CARDURA E and the first portion of DOWANOL PM acetate were charged to a suitable reactor and heated under a nitrogen atmosphere to reflux at about 160° C. The remaining ingredients were premixed and added slowly to the reactor charge over a 3-hour period while maintaining the reaction temperature at reflux. When the addition was complete, the reaction mixture was held at 156° C for 3 hours until an acid value of 4.6 was obtained. The resultant reaction mixture had a solids content of 69.1 percent. The polymer had a hydroxyl number of 134 and a weight average molecular weight of about 14,000.

The following examples (4–7) show the formulation of clear coating compositions using the polymers of Examples 1–3 and an aminoplast curing agent. The coating compositions were applied to coated substrates as clear coats and as repair coats, cured and evaluated for hardness, solvent resistance, resistance to acid etching, gloss and distinctness of image.

EXAMPLE 4

A clear coating composition formulated with a hydroxyl-containing polymer of Example 1 was prepared as follows:

| Ingredients | Parts by Weight (grams) | Resin Solids |
| --- | --- | --- |
| U.V. light stabilizer solution[1] | 21.1 | 3.0 |
| Butylated melamine-formaldehyde (66% solids in butanol) | 53.0 | 35 |
| Polymer of Example 1 | 91.4 | 64 |
| Flow control agent[2] | 2.3 | 1.0 |
| Polybutylacrylate[3] (62% solids in xylene) | 0.65 | 0.4 |
| Ethanol | 6.0 | — |
| Phenyl acid phosphate (75% solids in isopropanol) | 0.8 | 0.6 |
| DC-200[4] (10% by weight in xylene) | 1.0 | 0.1 |

[1]The U.V. light stabilizer solution was a mixture of 10.5 parts by weight (ppw) hexyl acetate, 5.0 ppw of an aromatic solvent blend available from Exxon as AROMATIC 100, 2.6 ppw of butyl acetate and 3.0 ppw of the U.V. light stabilizer TINUVIN 328 from Ciba-Geigy Corp.
[2]Prepared in accordance with Example II of U.S. Pat. No. 4,147,688 and diluted on a 1:1 volume basis with 2-hexoxyethanol.
[3]Flow control agent, $M_w$ about 10,000; $M_n$ of about 2400.
[4]Silicon fluid from Dow Corning Corporation.

The above ingredients were mixed together in the order indicated with low shear mixing to form a clear coating composition. The composition was spray applied (wet on wet) to a steel panel which was previously coated with a black automotive topcoat composition available from PPG Industries, Inc. as UBCN 8555. The composite coating was baked at 250° F (121° C) for 30 minutes to cure the coating. The properties of the coating are reported in the table below.

EXAMPLE 5

In the manner of Example 4, a clear coating composition was formulated with a hydroxyl-containing polymer of Example 2 from the following ingredients:

| Ingredients | Parts by Weight (grams) | Resin Solids |
|---|---|---|
| U.V. light stabilizer solution | 21.1 | 3.0 |
| Butylated melamine-formaldehyde | 53.8 | 35.0 |
| Polymer of Example 2 | 93.5 | 65.0 |
| Polybutylacrylate | 0.75 | 0.45 |
| Ethanol | 6.0 | — |
| Phenyl acid phosphate solution | 6.1 | 4.6 |
| DC-200 | 1.0 | 0.1 |

The coating composition was spray applied as a repair coating to a substrate which had been previously coated with a color-clear topcoat. The repair coating was cured for 20 minutes at 180° F (82° C). The properties of the coating are reported in the table below.

EXAMPLE 6

In the manner of Example 4, a clear coating composition was formulated with a hydroxyl-containing polymer of Example 3 from the following ingredients:

| Ingredients | Parts by Weight (grams) | Resin Solids |
|---|---|---|
| U.V. light stabilizer solution | 21.1 | 3.0 |
| Flow control agent | 2.3 | 1.0 |
| RESIMINE 717[1] | 41.6 | 35.0 |
| (84% solids in butanol) | | |
| Polymer of Example 3 | 91.4 | 64.0 |
| Polybutylacrylate | 0.75 | 0.45 |
| Ethanol | 6.0 | — |
| Phenyl acid phosphate solution | 0.8 | 0.6 |
| DC-200 | 1.0 | 0.1 |

[1]Methylolated melamine-formaldehyde condensate available from Monsanto Co.

The ingredients were mixed together in the order indicated with low shear mixing to form the coating composition. The coating composition was thinned with methyl amyl ketone to a viscosity of 22 seconds measured with a No. 4 Ford cup.

The composition was applied to a water-based blue metallic coating available from Imperial Chemical Industries as M979. This product was prepared in accordance with the teachings of U.S. Pat. No. 4,403,003. The base coat was given a flash to remove a portion of the water. The clear coat was then spray applied and the composite coating cured for 30 minutes at 250° C. The properties of the cured coating are reported in the table below.

EXAMPLE A

A coating formulation base was prepared from the following mixture of ingredients:

| Ingredients | Parts by Weight (grams) | Resin Solids |
|---|---|---|
| CYMEL 1130[1] | 77.39 | 77.39 |
| Xylene | 187.74 | — |
| TINUVIN 328[2] | 7.20 | 7.20 |
| TINUVIN 900[3] | 7.20 | 7.20 |
| Flow control agent | 16.35 | 7.20 |
| CYMEL 1130 | 162.43 | 162.43 |

| Ingredients | Parts by Weight (grams) | Resin Solids |
|---|---|---|
| Polybutylacrylate | 3.99 | 2.40 |
| Ethanol | 28.76 | — |

[1]Mixed methylolated-ethylolated melamine-formaldehyde condensate from American Cyanamid Co.
[2]Substituted benzotriazole U.V. absorber available from Ciba-Geigy Corp.
[3]Hydroxybenzotriazole U.V. absorber available from Ciba-Geigy Corp.

The above ingredients were mixed together in the order indicated with low shear mixing to form a coating base.

EXAMPLE 7

A clear coating composition was formulated from the following mixture of ingredients:

| Ingredients | Parts by Weight (grams) | Resin Solids |
|---|---|---|
| Coating Base A | 491.06 | 263.82 |
| Polymer of Example 3 | 340.07 | 232.61 |
| Catalyst[1] | 8.01 | 2.40 |
| (30% solids in isopropanol) | | |
| Xylene | 20.0 | |

[1]Dinonylnaphthalene disulfonic acid 50 percent neutralized with diisopropanolamine.

The ingredients above were mixed together with low shear mixing to form a clear coating composition which was spray applied to a steel panel which was previously coated with PPG's UBC 8555. The base coat was given a flash at room temperature and the clear coat then applied. The composite coating was then cured at 121° C for 30 minutes. The properties of the cured coating are reported in the table below.

The following example (Example 8) is a comparative example in which the hydroxyl-containing acrylic polymer is a conventional polymer of the prior art.

COMPARATIVE EXAMPLE 8

A clear coating composition was formulated from the following mixture of ingredients:

| Ingredients | Parts by Weight (grams) | Resin Solids |
|---|---|---|
| Coating Base A | 491.06 | 263.82 |
| Acrylic polymer[1] | 332.30 | 232.61 |
| Catalyst | 8.01 | 2.40 |
| Xylene | 51.71 | |

[1]70 percent solids acrylic polymer prepared from 40 percent hydroxypropyl acrylate, 20 percent styrene, 19 percent butylacrylate, 18.5 percent butylmethacrylate, 2 percent acrylic acid and 0.5 percent methyl methacrylate having a $M_n$ of about 2600 and a $M_w$ of about 8500 in 30 percent solvent comprising 10 percent by weight isobutanol, 45 percent by weight xylene and 45 percent by weight of a mixed aromatic solvent, SOLVESSO 100 from Exxon.

The ingredients above were mixed together to form a clear coating composition. The coating composition was spray applied to a steel panel which was previously coated with PPG's UBC 8555. The base coat was given a flash at room temperature and the clear coat then applied. The composite coating was then cured at 121° C for 30 minutes. The properties of the cured coating are reported in the table below.

TABLE

Cured Coating Properties of Examples 4-8

| Example | Tukon Hardness[1] | Solvent Resistance[2] | Gloss[3] | DOI[4] | Acid Etching[5] | Humidity Resistance[6] Loss of 20 Degree Gloss |
|---|---|---|---|---|---|---|
| 4 | 5.68 | 100 (SS) | 87 | 100 | 1 | 0 |
| 5 | 6.57 | 100 | 90 | 80 | 1 | 1.2% |
| 6 | 7.64 | 100 | 93 | 80 | 1 | 1.2% |
| 7 | 5.18 | 100 (SS) | 85 | 80 | 1 | 2.5% |
| 8 | 6.76 | 100 | 88 | 80 | 8 | 2.3% |

[1] Determined by ASTM E-384.
[2] Solvent resistance determined by rubbing with normal hand pressure back and forth (double rubs) with an acetone-saturated cloth. The number of double rubs to remove the coating from the substrate is usually reported. After 100 double rubs, the test was terminated. (SS = slight softening)
[3] Measured with a 20 degree gloss meter manufactured by Gardner Instrument Co.
[4] Measured on a Dori-Gon Meter D47-6 manufactured by Hunter Laboratories.
[5] Drop of 10 percent by weight $H_2SO_4$ placed on cured coating and exposed to 25 percent relative humidity at room temperature for 3½ hours. Ratings are given a value of 1 to 10. A rating of 1 indicates no change in the coating. A rating of 10 indicates complete coating removal.
[6] Humidity resistance determined by using the coated substrates as the ceiling of a humidity chamber (QCT chamber) with the coating directed inwardly to the chamber. The chamber is heated to 140° F. (60° C.) and about a 2-inch (9 cm) level of water is located 3 to 5 inches below the coated panel.

EXAMPLE 9

A clear coating composition formulated with the hydroxyl-containing polymer of Example 1 and a polyisocyanate curing agent was prepared as follows:

| Ingredients | Parts by Weight | Solids |
|---|---|---|
| TINUVIN 328 | 3.0 | 3.0 |
| Methylisobutylketone | 7.0 | — |
| Oxohexylacetate | 16.0 | — |
| CAB solution[1] | 8.0 | 2.0 |
| BYK 300[2] | 1.0 | 0.1 |
| TINUVIN 292[3] | 0.5 | 0.5 |
| Polymer of Example 1 | 93.1 | 65.2 |

[1] 25% solution of cellulose acetate butyrate (CAB 551-0.2 from Eastman Chemicals) in 50/50 weight solution of methylisobutylketone/methylamylketone.
[2] 10% silica solution in methylamylketone from Byk-Mallinckrodt.
[3] Bis(1,2,2,6,6-pentamethyl-4-piperidinyl) decanedioate available from Ciba-Geigy Corp.

The above ingredients were mixed together in the order indicated with low shear mixing to form the first component of the coating composition. The polyisocyanate curing agent was incorporated into the coating composition as follows:

| Ingredients | Parts by Weight | Solids |
|---|---|---|
| First Component | 257.2 | 141.6 |
| Methylisobutylketone | 32.6 | — |
| Dibutyltin dilaurate[1] | 0.7 | 0.07 |
| DESMODUR N[2] | 92.6 | 65.75 |

[1] 10% solution in methylamylketone.
[2] Isocyanurate of hexamethylene diisocyanate; 71% solids in methylamylketone from Mobay Corp.

The above ingredients were mixed together in the order indicated with low shear mixing to form a clear coating composition. The composition was spray applied to a steel panel which was previously coated with PPG's UBCN 8555. The base coat was given a flash bake for 10 minutes at 150° F (66° C) and then the clear coat applied. The composite coating was cured by heating for 30 minutes at 250° F (121° C).

The coating was soft having a Tukon Hardness of less than 2, but with good gloss and DOI, i.e., 82 and 90, respectively. The cured coating had good resistance to acid etching (4), good solvent resistance (100 acetone double rubs) and good humidity resistance (3.1% loss of gloss).

We claim:

1. A curable coating composition comprising a hydroxyl-containing polymer and a curing agent which is reactive with the hydroxyl groups in the polymer and is present in an amount sufficient to form a cured product; said hydroxyl-containing polymer having a hydroxyl number of at least 130 and a weight average molecular weight of less than 15,000 which is curable with a curing agent reactive with active hydrogens in the polymer and which is prepared by heating in the presence of a free radical initiator, the following reactive ingredients:
   (A) a polymerizable alpha, beta-ethylenically unsaturated carboxylic acid and
   (B) an epoxy compound containing at least 5 carbon atoms which is not addition polymerizable with (A) having the following structure:

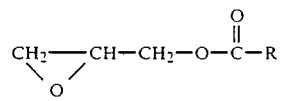

where R is a tertiary aliphatic hydrocarbon group of 4 to 26 carbon atoms;
   (A) and (B) amounting to at least 80 percent by weight of the reactive ingredients and the equivalent ratio of acid in (A) to epoxy in (B) is at least 1 to 1.

2. The coating composition of claim 1 in which the polymerizable alpha, beta-ethylenically unsaturated carboxylic acid is selected from the class consisting of acrylic acid, methacrylic acid, itaconic acid and mixtures thereof.

3. The coating composition of claim 1 in which R contains from 8 to 10 carbon atoms.

4. The coating composition of claim 1 wherein the hydroxyl-containing polymer is prepared from said alpha, beta-ethylenically unsaturated carboxylic acid, and epoxy compound and additionally another polymerizable alpha, beta-ethylenically unsaturated monomer.

5. The coating composition of claim 4 in which the other copolymerizable alpha, beta-ethylenically unsaturated monomers are selected from the class consisting of alkyl esters of alpha, beta-ethylenically unsaturated monocarboxylic acids containing from 1 to 12 carbon atoms in the alkyl group, hydroxyalkyl esters of ethylenically unsaturated monocarboxylic acids containing from 2 to 3 carbon atoms in the hydroxyalkyl group and mixtures of such monomers.

6. The coating composition of claim 5 in which the other copolymerizable alpha, beta-ethylenically unsaturated monomers are present in amounts of less than 15 percent by weight of the reactive ingredients.

7. The coating composition of claim 1 in which the hydroxyl-containing polymer has been prepared by heating said reactive ingredients in the presence of a chain transfer agent.

8. The coating composition of claim 1 in which the curing agent is an aminoplast.

9. The coating composition of claim 1 in which the curing agent is a polyisocyanate.

* * * * *